S. T. BRYCE.

HOT AIR FURNACE.

No. 10,747. Reissued July 27, 1886.

Attest
J. Hatton Sims
J. Simpson Roebuck Jr.

Inventor
Stephen T. Bryce
by Wood & Bond
his Attorneys &c.

UNITED STATES PATENT OFFICE.

STEPHEN T. BRYCE, OF DAYTON, OHIO.

HOT-AIR FURNACE.

SPECIFICATION forming part of Reissued Letters Patent No. 10,747, dated July 27, 1886.

Original No. 319,062, dated June 2, 1885. Application for reissue filed March 1, 1886. Serial No. 193,697.

*To all whom it may concern:*

Be it known that I, STEPHEN T. BRYCE, a citizen of the United States, residing at Dayton, in the county of Montgomery and State of Ohio, have invented a new and useful Hot-Air Furnace, of which the following is a specification, reference being had to the accompanying drawings.

This invention has relation to self-feeding furnaces and stoves; and it has for its object to provide a heater of the class referred to that shall possess superior advantages over others in point of simplicity, durability, and general efficiency; and it consists in the construction and novel arrangement of parts, as will be hereinafter fully described, and particularly pointed out in the claims.

Figure 2:
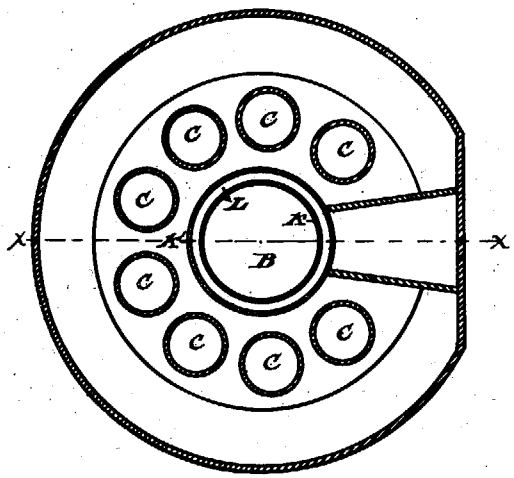
Figure 1:
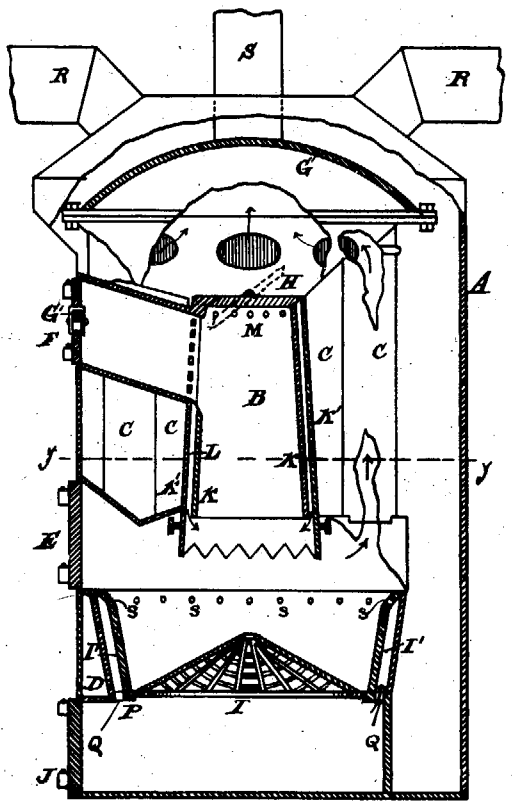

In the drawings, Figure 1 is a vertical sectional view on the line *x x* in Fig. 2; and Fig. 2 is a horizontal section on the line *y y* in Fig. 1.

Referring by letter to the accompanying drawings, A designates the casing of a stove or furnace. B is the magazine, which is partially surrounded by hot-air flues C. D is the fire-bowl; E, the fire-door; F, the feed-door; G, the radiator; H, the clean-out trap; I, the grate, and J the door to the ash pit or pan.

The magazine is provided with a double wall, K K′, and is constructed with uniform or gradual increase from top to bottom to facilitate self-feeding. The double walls K K′ form an air-space, L. The feed-door is provided with a register or openings, G′, through which air is introduced and passes through openings in the inner wall or cylinder of the magazine K into the air-space L and down, and again enters the magazine just above the fire-chamber, thereby supplying a downdraft to the fire, and preventing the coal from burning or charring in the magazine. The air in passing down through the air-space carries with it the smoke and gases accumulated in the magazine to the fire-chamber, where they are consumed, and also operates to keep down the temperature of the feed-cylinder. The top radiator, G, is provided with a clean-out trap, H, which is located directly over the feed-cylinder, and is pivoted and arranged to dump the soot and ashes accumulating in the radiator directly into the fire through the magazine. The fire-bowl D is lined either with cast-iron or fire-brick, with a space, I′, between said lining and the fire-bowl. The lining is supported by a cast-iron ring, P, provided with holes or orifices Q to admit air from the ash-pit to the air-space between the fire-bowl and lining, which air passes out of said space through openings S at the top of the lining into the fire-chamber above the coal, for the purpose of protecting the fire-bowl and preventing it from burning out, and to insure more perfect combustion of the smoke and gases.

R R are the hot-air flues leading from the furnace, and S is the smoke-flue.

It will be seen that by the introduction of air to the magazine above the fuel, the temperature of the inner chamber will be modified, and a current of air will be supplied to the space or passage between the two walls of the magazine, which will carry with it to the combustion-chamber any gases or smoke accumulating in the magazine.

I am aware that it has been proposed to construct stoves with magazines having tubes extending down their inner sides, said tubes communicating with the inside of the magazine at their upper ends, and with the fire-chamber at their lower ends, and covers for the magazines having dampers for admitting air to the upper ends of the magazines, chambers around the upper ends of the magazines, and flues communicating with said chambers and with the fire-chambers, all of which I disclaim.

Having thus fully described my invention, what I claim as new, and desire to secure by Letters Patent, is—

1. A hot-air furnace having the casing provided with a register for admitting air above the fuel in the magazine, a magazine having an inner and an outer wall, the inner wall being provided with openings near its top, whereby a current of air is passed downwardly between the walls of the magazine to the combustion-chamber, a radiating-chamber located above the magazine, flues communicating with the radiating-chamber and with the combustion-chamber for conveying air to the radiating-chamber, and a trap between the upper end of the magazine and the radiating-chamber, for the purpose set forth, substantially as described.

2. The combination, with the fire-pot and combustion-chambers of a base-burning stove, of a magazine provided with an opening for the admission of air into the magazine and above the supply of fuel, and constructed with double walls, separated to provide an annular space between them, the inner wall being provided with openings at or near its top communicating with the annular space, through which the hot air and gases accumulated above the fuel in the magazine are carried down to the combustion-chamber, substantially as and for the purposes described.

In testimony whereof I have hereunto set my hand.

STEPHEN T. BRYCE.

Witnesses:

A. M. McCOMB,

SUMNER T. SMITH.